United States Patent
Schmidt et al.

(10) Patent No.: US 9,642,027 B2
(45) Date of Patent: May 2, 2017

(54) METHOD AND SYSTEM FOR PLATFORM-BASED DEVICE FIELD TESTS

(71) Applicant: Cellco Partnership, Basking Ridge, NJ (US)

(72) Inventors: Christopher M. Schmidt, Branchburg, NY (US); Gopi Venkatasubramaniam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 613 days.

(21) Appl. No.: 14/146,491

(22) Filed: Jan. 2, 2014

(65) Prior Publication Data

US 2015/0189525 A1    Jul. 2, 2015

(51) Int. Cl.
*G01R 27/28* (2006.01)
*G01R 31/00* (2006.01)
*G01R 31/14* (2006.01)
*H04W 24/08* (2009.01)
*H04W 40/20* (2009.01)
*H04W 64/00* (2009.01)

(52) U.S. Cl.
CPC .......... *H04W 24/08* (2013.01); *H04W 40/20* (2013.01); *H04W 64/006* (2013.01)

(58) Field of Classification Search
CPC ........ G01R 31/3177; G01R 31/318594; G01R 31/31725; G01R 31/31726; G01R 31/31727; G01R 31/318583; G01R 31/2834; G01R 35/005; G01R 31/31903; G01R 31/31907; G01R 31/2822; G01R 31/2874; G01R 31/31704
See application file for complete search history.

(56) References Cited

U.S. PATENT DOCUMENTS 8,732,528 B1 * 5/2014 Zhang ............... G06F 17/18 714/25
2009/0156198 A1 * 6/2009 Lee ................. H04W 24/08 455/425

* cited by examiner

*Primary Examiner* — Roy Y Yi

(57) ABSTRACT

An approach for receiving an input for specifying one or more parameters for evaluating a device under testing. The approach further involves generating a test route based on the input, wherein the test route represents a test environment in which the device under testing is expected to be subjected to the one or more parameters.

20 Claims, 15 Drawing Sheets

US 9,642,027 B2

METHOD AND SYSTEM FOR PLATFORM-BASED DEVICE FIELD TESTS

BACKGROUND INFORMATION

Wireless communication products and services are continually evolving their offerings to customers in an effort to stay competitive in today's fast-moving market. New products and services development require that the parameters of such new products and services are thoroughly identified by the manufacturer or service provider. Thus, field testing is a crucial step for producers of wireless products and services. However, field tests are taxing on resources, requiring dedicated manpower, expense, and time. Despite the effort required for field tests, the tests themselves may be error-prone and difficult to manage, especially when multiple locations require testing. However, wireless products and services producers must continue investing large amounts of personnel and resources into field tests because the data extracted from these tests are an essential step in business development and advancement.

Based on the foregoing, there is a need for platform-based device field test route generation and field testing.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for platform-based device field test route generation and field testing, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to platform-based device field test generation and testing, it is contemplated that these embodiments have applicability to systems operated by different organizations and to other operations wherein device field tests are generated and conducted.

Figure 1:
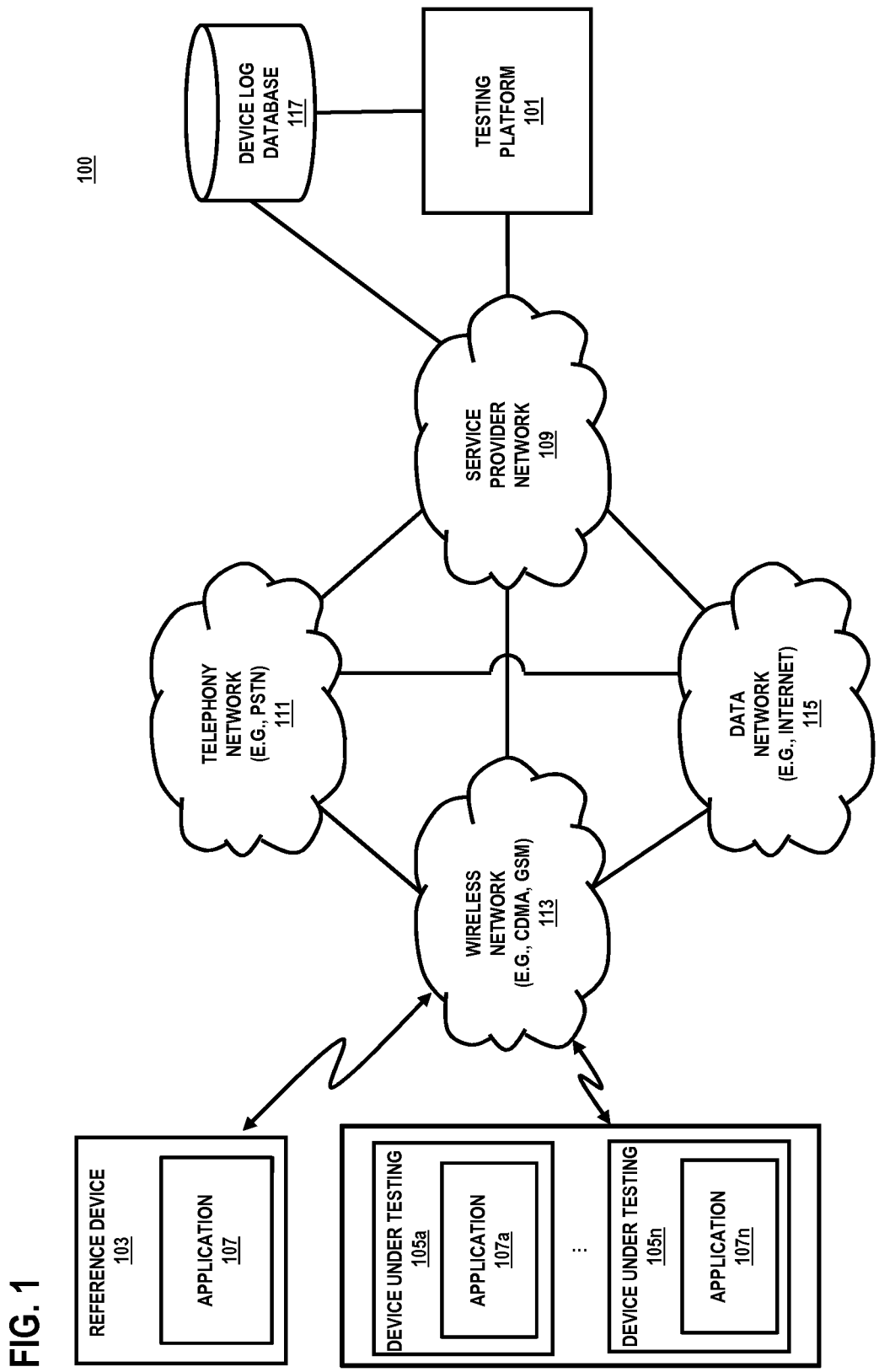
FIG. 1 is a diagram of a system capable of platform-based device field test route generation and field testing, according to an exemplary embodiment.

FIG. 1 is a diagram of a system capable of platform-based device field test generation and field testing, according to one embodiment. Fields tests are essential for many businesses, including wireless communication services and devices. Such field test may assist in processes such as certifying new devices and testing different markets. The field test process is comprised of three steps: generate test routes, field testing, and log analysis. Currently, these field test practices are carried out manually, making field tests route generation and auto field testing a time-consuming, error-prone, expensive and complicated process. For example, the current method of generating test routes requires test engineers to manually create a test route while accounting for variables such as a location's signal strength, total drive time, number of cell sites, and all other test parameters. This method is time-consuming and error-prone. For the field test itself, test engineers must be in attendance in order to initiate and monitor the device at the start and during the drive, thus requiring dedicated resources for the field testing. Additionally, when a large number of markets and locations must undergo the same test, managing the multiple tests becomes a tedious and complex task. In the log analysis step, the test engineers manually post process and analyze driving test logs files.

To address this problem, a system 100 of FIG. 1 introduces the capability for a testing platform 101 to process a request for device field test automation based on controlled parameters, determine a test route addressing such parameters, schedule field tests along the test route, and collect the driving test log files. A test route may be any traveling route that may include driving streets, sidewalks, hiking trails, train tracks, subway systems, or any other distance between two points or a loop such as a circle, figure eight, or any other continuous pattern. A device field test are tests seeking to determine performance capabilities and limits for a device under test, and such tests are typically designed to take place upon a test route. As such, the system 100 allows for test engineers to create a unique testing environment by identifying (inputting) to the system 100 which parameters the test engineers seeks to test. A testing environment contain least partially anticipated or planned conditions such as travel type, signal strengths, time, place, and other environmental and (device) internal factors which may have an impact device performance. The system 100 may then utilize the input from the test engineers to generate field test routes which may reflect the testing environment sought by the test engineer. For example, a test engineer need only input into the system 100 that she requires the inclusion of three cellular towers during peak hours and the system 100 may identify at least one test route that meet her requirements. Accordingly, most of the labor-intensive manual steps, like the test engineer creating the route herself by searching for different towers on maps, are no longer required, thus saving time, money, and resources while improving efficiency and reliability. This approach will reduce business expenses related to field tests significantly, while simultaneously improving efficiency and device quality.

The proposed test architecture may involve a testing platform 101, a reference device 103, and device under test (DUT) 105. Reference device 103 and DUT 105 (hereinafter referred to as devices 103 and 105) may communicate over system 100 and may include any customer premise equipment (CPE) capable of sending and/or receiving information over one or more of networks 109-115. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

The reference devices 103 were tested and approved by quality standards set by the manufacturer or service provider in order to ensure that these reference devices 103 are well-established and carry a superior performance history. The reference device 103 may act as the control group for the field test, thus serving the role of a standard device by which the DUT 105's performance may be measured or compared against. In other words, the reference device 103 may be the control group in a scientific experiment analogy. Device performance is a function of device software, hardware and mechanical characteristics. The DUT 105 may match or exceed the reference device 103's performance. The DUT 105's functionality and performance may then be compared with the reference devices 103 and classified accordingly.

The testing platform 101 provides at least two functions, comprising of: storing the device logs; and hosting the application 107 for remotely controlling the devices 103 and 105 to trigger testing and also to analyze device logs. In one embodiment, the testing platform 101 controls the devices 103 and 105 through an application 107. In one embodiment, test routes and test environments are pushed remotely from the testing platform 101 to the devices 103 and 105. After completing the field test, the devices 103 and 105 automatically uploads log files to the testing platform 101 for post processing and analysis. As shown, the system 100 includes a testing platform 101 implemented as, for example, part of a service provider network 109 for generating test routes and executing field tests with the service provider network 109. However, in alternative embodiments, the testing platform 101 may be implemented as any part of the system 100. The testing platform 101 is associated with device logs database 117 for storing device log files information and device log tables. The service provider network 109 may interact with one or more other networks, such as a telephony network 111, a data network 115, and/or a wireless network 113.

For illustrative purposes, the networks 109-115 may be any suitable wireline and/or wireless network, and be managed by one or more service providers. For example, telephony network 111 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

The devices 103 and 105 may execute one or more applications 107. The applications 107 may execute test scenarios on devices 103 and 105 and collect device logs. A device log is a record of the devices 103 and 105's specifications and performance in a device field test. According to one embodiment, application 107 manages the devices 103 and 105 connection through Bluetooth or WiFi for capability exchange and synchronizing test execution. The applications 107 may be any type of application that is executable at the devices 103 and 105. By way of example, applications 107 may include one or more media player applications, social networking applications, calendar applications, content provisioning applications, location-based service applications, navigation applications, and the like. In one embodiment, one of the applications 107 at the devices 103 and 105 may provide or act as an interface with respect to the testing platform 101 and the device logs database 117. By way of example, application 107 may act as a client for testing platform 101 and perform one or more functions associated with the functions of the testing platform 101 at the devices 103 and 105 by interacting with the testing platform 101 over communication networks 109-115 and/or communicating with the device logs database 117.

In one embodiment, the database 117 may store log data collected during the device field tests by the devices 103 and 105. The database 117 may also store previous test routes, saved test routes, testing schedules, and testing data history. In one embodiment, the testing platform 101 may include and/or have access to the database 117 to access and/or store information associated with different device field tests. In one embodiment, the database 117 may access and/or store cell tower locations, routes, locations, maps, peak days and times, signal strength histories, speed limits, testing types (e.g., voice or data), frequency band history, and hand off types and other data. In one embodiment, devices 103 and 105 and application 107 may access and store items in the database 117.

Test routes are created to test the device functionality and performance in a known test environment. The test environment will be representative of the network coverage, network congestion/loading, number of handovers, etc. The following variables control the creation of a test route: signal strength (e.g., Reference Signal Receive Power (RSRP), Reference Signal Receive Quality (RSRQ), Signal to Interference Noise Ratio (SINR)), duration of testing (e.g., 30 minutes, 1 hour, 2 hours, etc.), number of cell sites (e.g., 2, 3, 4, 5, etc.), test route speed (e.g., highway, city, residential, mix, etc.), location (e.g., country, state, county, city, etc.), type of testing (e.g., voice, data, etc.), time of the day (e.g., peak, off peak, etc.), frequency bands (e.g., 700, Advance Wireless Services (AWS), etc.), and handoff type (e.g., S1 vs. X2).

In one embodiment, the applications 107 may provide users with the above parameters to create a test route. In one embodiment, the above parameters may be in the form of a drop down menu, radio buttons, or other method of presentation wherein the user may select the required combination to generate a desired test route and test environment. Once the desired parameters are selected, there may be an option to generate the test route. The testing platform 101 may then synthesize all of the selected parameters into a cognizable test route meeting all of the parameters set by the user. The testing platform 101 may send the generated test routes to the devices 103 and 105 through the networks 109-115. According to one embodiment, the devices 103 and 105 may display the route in a map on the testing platform 101's web page. The user may save this test route and also schedule a field test based on this test route.

According to one embodiment, the user may have the option to manually modify the test route using the map on the testing platform 101's web page. In one embodiment, the manual changes made to the generated test route may be reflected in the test routes' parameter settings. In other words, there may be a two-way dependency between the selected parameters and the generated route wherein changes that are manually inputted by one side may be reflected in the other side. For example, a user may open a map application and may draw free-hand a new driving test route from a "blank" map (a map without a previous route). The parameters of the hand-drawn route may automatically be updated to reflect its testing parameters.

In one embodiment, the testing platform 101 may have an option to schedule a field test on devices 103 and 105 through the application 107. As a part of the test scheduling, the testing platform 101 may push the test routes and test environments to the devices 103 and 105. Once the test is downloaded on the devices 103 and 105, the devices 103 and 105's navigation applications (e.g., built-into the application 107, native map application, third-party map application, etc.) may display the test route. The application 107 may execute the test scenarios (e.g., FTP, VoIP calls, etc.). For the duration of the field test, application 107 may be collecting device logs. Upon test completion, the device log files may be uploaded to the testing platform 101 for post processing and analysis. According to one embodiment, the testing platform 101 may send a notification to the user once the reports are ready for review. Alternatively, the DUT 105 may present a notification at the end of the field test whether or not the field test was completed successfully.

In one embodiment, multiple DUTs 105 may undergo the same test environment simultaneously. That is, the testing platform 101 may push the same test route and test environments to the multiple DUTs 105, and may program the plurality of DUTs 105 to undergo the testing environments simultaneously. In an example use-case, each DUT 105 may be placed in the same vehicle as each DUT 105 tests a different device feature. When testing multiple DUTs 105, the reference device 103 may be synced with all of the multiple DUTs 105.

In another embodiment, the testing platform 101 may schedule multiple tests for one or more DUTs 105. For example, the DUT 105 may receive a request to initiate the test route and test environment during a set range of signal strengths. Thus, upon sensing signal strength within the set range, the testing platform 101 may authorize testing initiation.

In another embodiment, the test route may be a loop such that the test may begin at any point within a loop, unlike a straight line wherein there would be a preset beginning and end. Such looping capability allows the testing platform 101 greater flexibility in scheduling field tests. In contrast, the testing platform 101 may also begin a driving test at a predefined time (e.g., 2:00 PM) as defined by the user upon scheduling the test.

In addition to pushing the test routes and test scenarios to the DUT 105, in another embodiment, the testing platform 101 may also push a test analyzer to the reference device 103. Thereafter, the testing device logs may be pushed from the DUT 105 to the reference device 103. The post processing analysis may be performed on the DUT 105 and results may be pushed to the testing platform 101. A summary of results may be displayed on the reference device 103.

In order to compare the performance of the DUT 105 with the reference device 103, the device settings and capabilities on both devices 103 and 105 must be the same. This may be accomplished by sending the device profile of the reference device 103 to the DUT 105. The device profile from the reference device 103 may be sent to the DUT 105 through a Bluetooth or WiFi connection using the application 107. The application 107 may create a profile with the following information: network mode (e.g., 4G, 3G, etc.), Internet Protocol (IP) Multimedia Subsystem (IMS) registration Status (e.g., IMS registered, Not Registered, etc.), RSRP, Battery Level, and Idle computer processing unit (CPU) utilization. Once the profile is sent from the reference device 103 to the DUT 105, the application 107 in the DUT 105 compares both of the profiles to check for consistency. According to one embodiment, if differences exists, then the testing platform 101 may provide a short summary (in the form of a pop up on the DUT 105) which may include a summary of differences. Based on this information, the field test engineer may make appropriate changes in either the reference device 103 or DUT 105. Once the changes are made, the profile checking process may be repeated until the profiles match. Once the profiles match, then the test may be scheduled successfully. The testing platform 101 may not allow execution of the field test until the device profiles are synchronized. Additionally, the device synchronization extends to the testing time as well as the device settings. Thus, the devices 103 and 105 must begin the test drive simultaneously. While device synchronization is critical at the beginning of the test, the devices 103 and 105 do not need to remain synced throughout the duration of the test. Any loss of synchronization would be recorded in the log file.

In one embodiment, the testing platform 101 allows for management of the driving test remotely. For example, a remote test engineer may begin and end a field test. The remote test engineer may also monitor the progress of a field test and control what is happening to the devices 103 and 105. The test engineer may see the device's 103 and 105 screens and have real-time telematics control.

In another embodiment, the testing platform 101 may dynamically create a new test route or test environment based on the results of the previous or current test route or test environment. The new test route or test environment may immediately follow the initial test route or test environment, scheduled at a later time, or even before the initial test route or field test has been completed. In one embodiment, the testing platform 101 may be given if-then clauses in the parameters such that certain field test results, which may be readable by the testing platform 101, may be determined and affect whether a follow up test may be required. For example, the testing platform 101 may receive parameters which require the testing platform 101 to determine the DUT 105's performance at peak hours and if the performance fails a predetermined threshold, the testing platform 101 may be programmed to automatically run the test again during off-peak hours before reporting the testing is complete. In another embodiment, the testing platform 101 may dynamically alter some of the parameters during the field test, based on the user's predefined if-then clauses. For example, if the DUT 105 exceeds a preset benchmark for performance after utilizing three cell towers, the testing platform 101 may be instructed to continue the test until a fourth cell tower signal has also been tested before the testing platform 101 may mark the test as complete.

Figure 2:
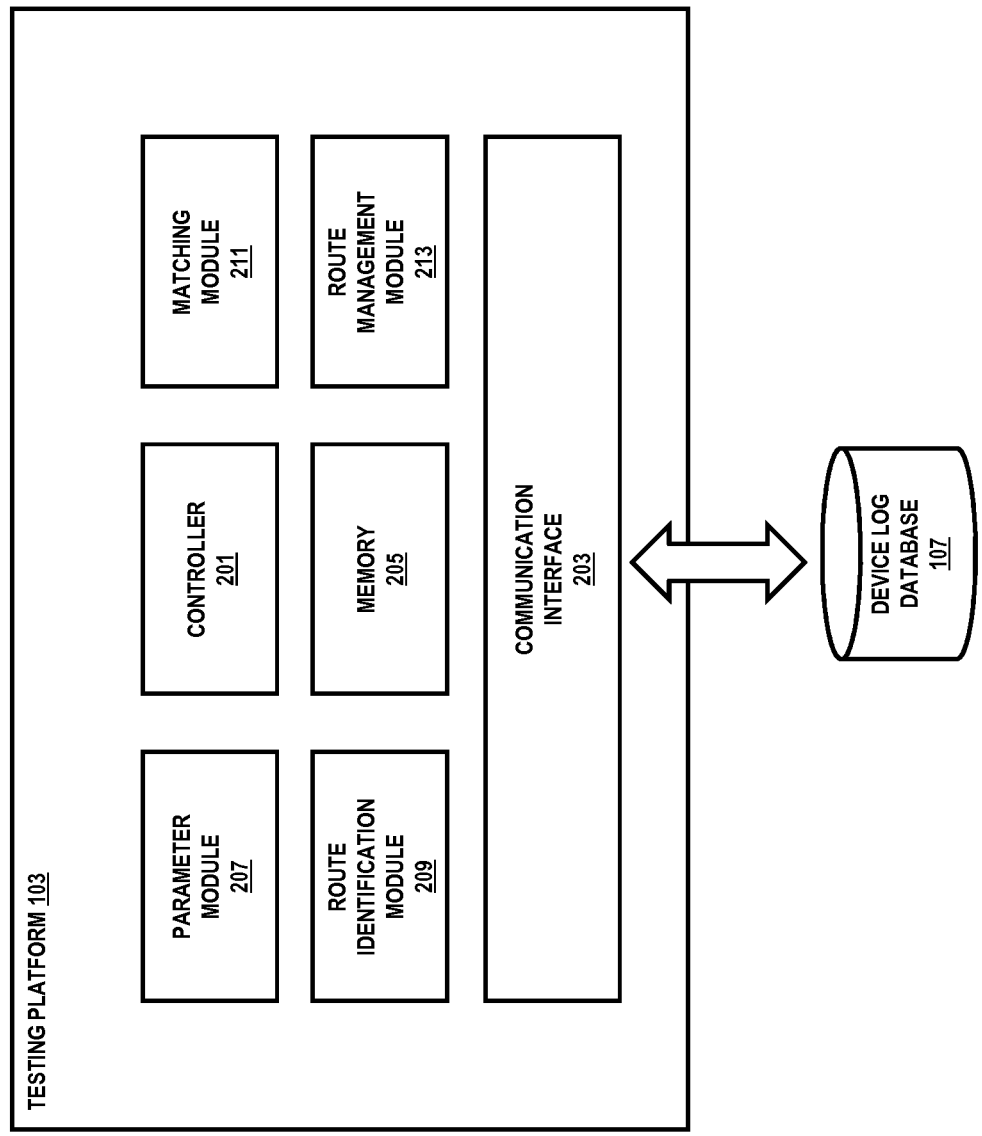
FIG. 2 is a diagram of a testing platform capable of platform-based device field test route generation and field testing, according to an exemplary embodiment.

FIG. 2 is a diagram of the testing platform 101 used in the system of FIG. 1, according to an exemplary embodiment. Although illustrated as a separate element with respect to a service provider network 109 within the system 100, the testing platform 101 may alternatively be embodied in, for example, one or more applications 107 executed at the devices 103 and 105 or connected to another one of the networks 109-115. In one embodiment, the testing platform 101 contains a controller 201, a communication interface 203, a memory 205, a parameter module 207, route identification module 209, a matching module 211, and a route management module 213. The testing platform 101 may communicate with the device log database 117 to retrieve a device's profile, archived history, maps, map data, network data, traffic data, and file logs.

The controller 201 performs control logic functions and facilitates coordination among the other components of the testing platform 101. In one embodiment, the communication interface 203 receives parameter input from a user's selections via networks 109-115 and provides this data throughout the testing platform 101. After the communication interface 203 receives the parameter input data, the controller 201 or the communication interface 203 may transfer the parameter input data to the parameter module 207. The parameter module 207 may utilize the parameter input to identify real world objects and data that could be used during the driving test. For example, the real world objects and data include specific cellular towers; different route speeds like highways versus streets; specifications, like signal strength and frequency bands; and any other type of information the testing platform 101 could use to determine a test route like peak and off peak times or the type of testing like voice or data. Such real objects and data would be identified with the help of a base-station almanac, possibly located in the device log database 117 or the memory 205. Once the parameter module 207 identifies the real world objects and data, the communication interface 203 or controller 201 may transport the real world objects and data to the route identification module 209 to generate a field test route.

The route identification module 209 may locate the real world objects and data using a map database (not shown), wherein the map database may identify the locations of the real objects and data in question. The map database may be stored in the memory 205 or the device log database 117. The route identification module 207 may create a test route based on the location of the real objects and data on the map. In a use case where the communication interface 203 receives input that the user modified the path of the generated test route on a map or drew a route on a "blank" map, the route identification module 209 may identify the real world objects and data along the manually drawn map route before transferring the real world objects and data the parameter module 207. At this point, the parameter module 207 would then determine a list of parameters based on the real world objects and data identified along the manually edited route.

The matching module 211 may identify the devices which are to be the reference device 103 and the DUTs 105. The matching module 211 may create a profile file for each device with information such as: network mode, IMS registration status, RSRP, battery level, and idle CPU utilization. The matching module 211 may compare the profiles of the devices 103 and 105 for consistency. If there are differences between the devices 103 and 105, the matching module 211 may summarize those differences create a notification on the devices 103 and 105 or the testing platform 101 web application indicating the inconsistencies between the devices 103 and 105. The test engineer may then make appropriate changes in order to synchronize the devices. Once the test engineer's changes have been made on the devices 103 and/or 105 to make them the same, the matching module 211 may repeat this process until it determines devices are synchronized. Once the matching module 211 has determined that the devices 103 and 105 have been synchronized, the matching module 211 may authorize the route management module 213 to schedule a driving test.

The route management module 213 may schedule a field test based on received input. For example, the route management module 213 may schedule the field test as directly inputted by the user (e.g., Tuesday at 5 PM), or indirectly inputted by the user (peak hours). The route management module 213 may receive field test logs during and after a field test. The route management module 213 may in some case schedule a field test using the results of the field test log as the information becomes available. For example, the user includes an if-then clause in the test schedule. An example if-then clause may be based on how a DUT 105 performs in the parameters which may prompt the route management device 213 to automatically create a new test, or prematurely end, or continue the current test. The route management module 213 may also schedule linear tests with a beginning and end point or loop tests, which may be circular (e.g., the test route follows a circular path). The route management module 213 may initiate the start of a field test or send scheduling information to the devices 103 and 105.

Figure 3:
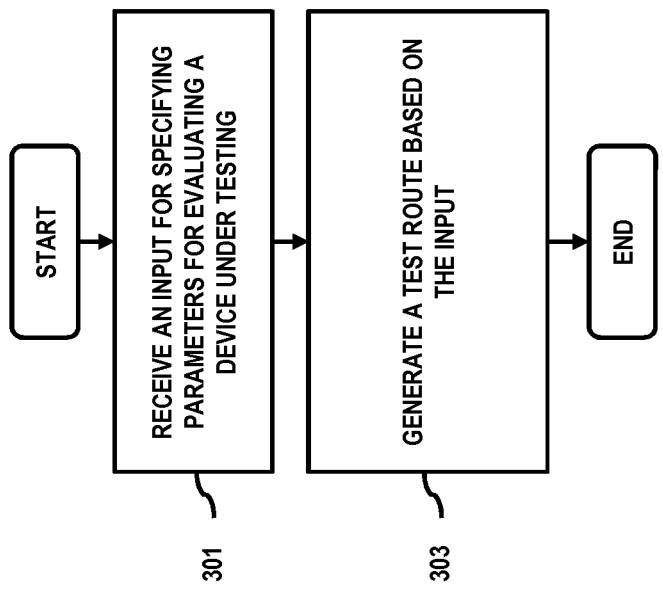
FIG. 3 is a flowchart for platform-based device field test generation and field testing, according to one embodiment.

FIG. 3 is a flowchart for platform-based device field test generation and field testing, according to one embodiment. In one embodiment, the testing platform 101 performs the process 300 and is implemented in, for instance, a chip set including a processor and a memory as shown in FIG. 13. Although FIG. 3 illustrates steps 301 through 303 in a particular order, the order and number of steps are merely for explanation, and one or more steps may be performed in a different order or removed. In step 301, the testing platform 101 receives an input for specifying one or more parameters for evaluating a device under testing, wherein the one or more parameters include a signal strength parameter, a duration of testing parameter, a number of cell sites parameter, a test route speed parameter, a location parameter, a testing type parameter, a time parameter, a frequency band parameter, a handoff type parameter, or a combination thereof.

For example, a test engineer may need to test a device's performance during peak hours on a certain highway. The test engineer may input the parameters of the test environment into the system 100. In one embodiment, the test engineer may use a remote desktop and utilize a web application to set the parameters of the test environment. The remote desktop may transfer the user's input via the networks 109-115 to the testing platform 101 for further processing. In another embodiment, the test engineer may set such parameters via the devices 103 and 105. The devices 103 and 105 may contain an application 107 which is capable of processing the user's input for the next step. In another embodiment, the input from the remote web application may transfer the input to the devices 103 and 105 for processing at the devices 103 and 105 rather than at the testing platform 101.

In step 303, the testing platform 101 generates a test route based on the input, wherein the test route represents a test environment in which the device under testing is expected to be subjected to the one or more parameters. The system 100 is capable of generating a test route based on the test engineer's aforementioned input. Continuing with the above example, the testing platform 101 may identify a particular window of time on several dates on the specified highway wherein the DUT 105 may be tested during peak hours. The testing platform 101 may then create discrete test routes on which the DUTs 105 may be tested according to the test engineer's input. In one embodiment, the testing platform 101 may present the generated test routes for the test engineer's approval and/or to give the test engineer an opportunity to select a preferred test route. In another embodiment, the testing platform 101 may select a test route for the test engineer.

Figure 4:
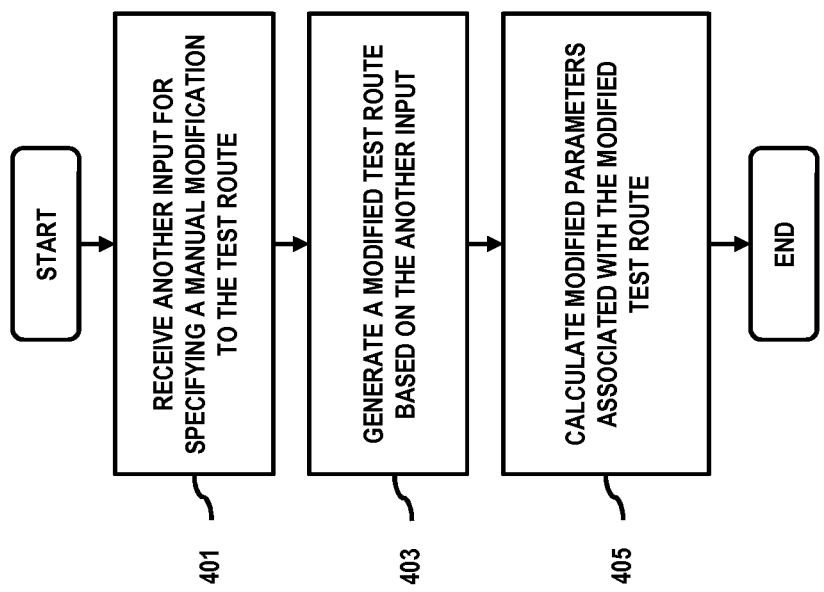
FIG. 4 is a flowchart of the two-way dependency between the list of parameters and test route displayed on a map application, according to one embodiment.

FIG. 4 is a flowchart of the two-way dependency between the list of parameters and test route displayed on a map application, according to one embodiment. In one embodiment, the testing platform 101 performs the process 400 and is implemented in, for instance, a chip set including a processor and a memory as shown in FIG. 13. Although FIG. 4 illustrates steps 401 through 405 in a particular order, the order and number of steps is merely for explanation, and one or more steps may be performed in a different order or removed. In step 401, the testing platform 101 receives another input for specifying a manual modification to the test route. The system 100 allows for modification of the generated route within the mapping application displaying the test route. For example, continuing with the previous example, after the testing platform 101 generates the test route for the test engineer's input parameters, the test engineer may click and drag anywhere on the generated test route to lengthen, shorten, alter, or make any additional edits to the test route. The testing platform 101 may receive such input after the test engineer has confirmed the settings. The altered test route may be saved and scheduled by the testing platform 101 in the same way as the original test route. In another example, the test engineer may edit the previous parameters at the web application or devices 103 or 105 after viewing the generated test route. In another example, the test engineer may edit the parameters or map view of the test route while the field test is in progress, or after completion of the field test.

In step 403, the testing platform 101 generated a modified test route based on the another input. Once the initial parameters are inputted and the test route has been generated, the user may be able to edit the generated test route and initial parameters in a number of ways. First, the user may click and drag anywhere along the route to make changes directly unto the route itself. Additionally, the user may edit the initial parameters entered in the list view. For example, continuing with the previous example, the test engineer may opt to edit the initial set of parameters after the test route had been generated. The test engineer may access the web application, or the devices 103 and 105 to input the edits. In response, the testing platform 101 may receive the edit input and may shift or change the original test route according to the additional edits.

In step 405, the testing platform 101 may calculate one or more modified parameters associated with the modified test route. The testing platform 101 may process input either from the test route on the map application or the list of parameters. Regardless of the source of input, the testing platform 101 may reflect the result of the input throughout the system 100. For example, the testing platform 101 may update the generated test route to reflect edits to the list of parameters and vice versa. Continuing with the above example, the testing platform 101 may update the previous list of parameters (the parameters originally inputted by the test engineer) to reflect any resultant differences after a test engineer has clicked and dragged around the original generated route.

For example, if the test engineer has inputted that the field test takes place in New York but when the test is generated, the test route does not enter the proximity of Central Park. Because the test engineer may not have an option to have the test route go through Central Park in his list of parameter options, he may click and drag the generated test route in the mapping application so that the test route may go through Central Park. Once the test engineer submits this edit, the testing platform 101 may update the list of parameters to reflect any changes to the test environment. The test engineer notices that the number of cell towers have now increased from three to five and the duration of the test will now require an extra twenty-five minutes. The test engineers also notices that other parameters of greater importance to the performance test (in this situation) such as the signal strength and frequency bands were unchanged. Thus, the test engineer finds the changes to the original test route acceptable.

Figure 5:
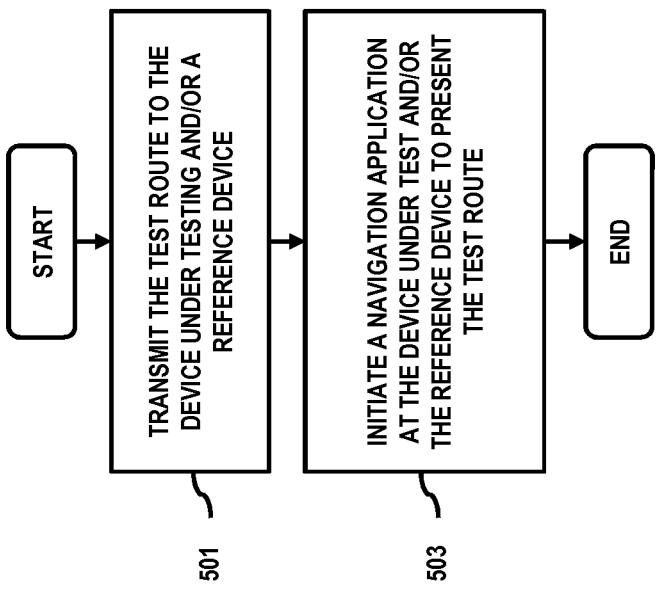
FIG. 5 is a flowchart for remotely transmitting and displaying test routes to reference and test devices; according to one embodiment.

FIG. 5 is a flowchart for remotely transmitting and displaying test routes to reference and test devices, according to one embodiment. Although FIG. 5 illustrates steps 501 through 503 in a particular order, the order and number of steps is merely for explanation, and one or more steps may be performed in a different order or removed. In one embodiment, the testing platform 101 performs the process 500 and is implemented in, for instance, a chip set including a processor and a memory as shown in FIG. 13. In step 501, the testing platform 101 transmits the test route to the device under testing, a reference device, or a combination thereof. Once a test route has been selected, the user may directly input the test schedule to the testing platform 101 by entering the date and time of the field test or the user may input the schedule information indirectly though the list of parameters for the field test. The testing platform 101 may push the test route, test environment, and test schedules to the devices 103 and 105, based on either the direct or indirect input received from the user. For example, a test engineer may input parameters for a field test in Minnesota. The testing platform 101 may receive this input and generate a test route. The testing platform 101 may then push this test route to devices in California, the determined location of the test, upon the generation and schedule determination of the test route and test environment.

In step 503, the testing platform 101 initiates a navigation application at the device under testing, the reference device, or a combination thereof to present the test route. The testing platform 101 and/or the application 107 may facilitate a presentation of the test route on the devices 103 and 105 using the device's 103 and 105 local map or navigation application. In one embodiment, the navigation or map application may be built into the application 107 so that the system 100 may display the test route without the help of a third party application. In another embodiment, the testing platform 101 or the application 107 may display the test route on a local mapping or navigation application within the devices 103 and 105. In another embodiment, the testing platform 101 or the application 107 may display the test route in the device's web browser pointed to an online mapping service capable of displaying maps and routes.

Figure 6:
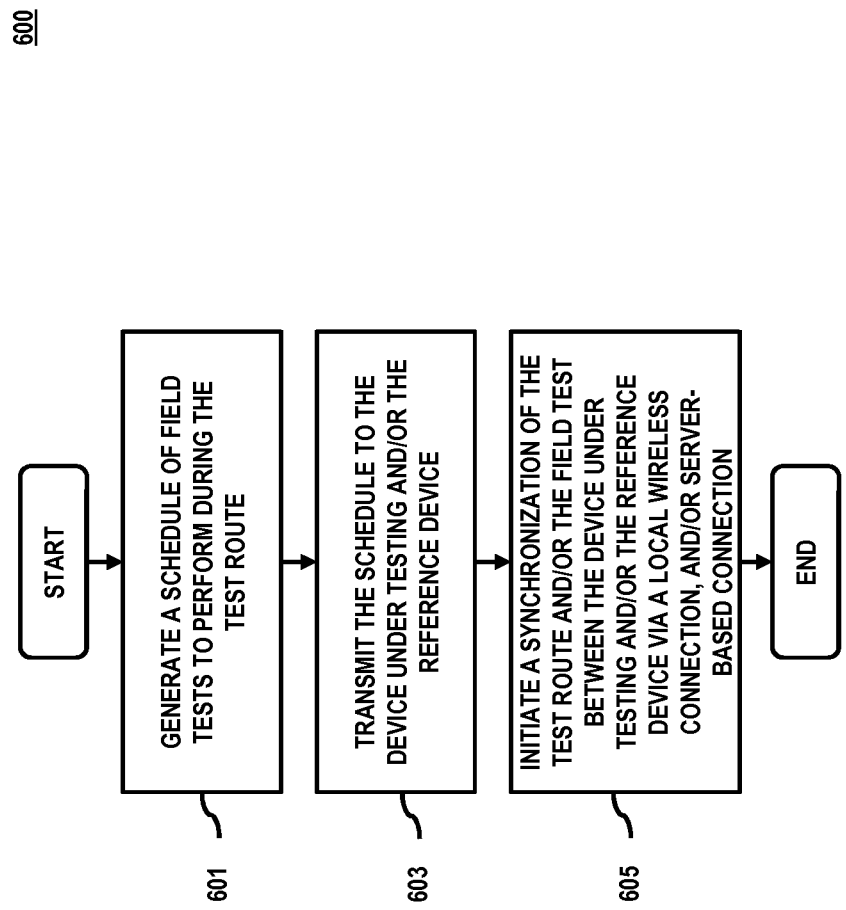
FIG. 6 is a flowchart for remotely executing and coordinating device field test among a plurality of devices, according to one embodiment.

FIG. 6 is a flowchart for remotely executing and coordinating device field test among a plurality of devices, according to one embodiment. Although FIG. 6 illustrates steps 601 through 603 in a particular order, the order and number of steps is merely for explanation, and one or more steps may be performed in a different order or removed. In one embodiment, the testing platform 101 performs the process 600 and is implemented in, for instance, a chip set including a processor and a memory as shown in FIG. 13. In step 601, the testing platform 101 generates a schedule of field tests to perform during the test route. In addition to generating the test route, the testing platform 101 may also determine a testing schedule of the field tests according to the input received. Fields tests are the testing environment test engineers sought to create when entering parameter input. For example, a test engineer may want to test a device's performance during an S1 handoff type in the city, a residential neighborhood, and on the highway. The testing platform 101 may schedule a field test wherein the device may be in a city location during an S1 handoff before routing the test route through a residential neighborhood with another S1 handoff, before finally routing the test route through a highway for the final S1 handoff.

In step 603, the testing platform 101 may transmit the schedule to the device under testing, the reference device, or a combination thereof. As previously explained, the testing platform may receive input from the user either directly or indirectly to ascertain when to schedule a field test. For example, the testing platform may receive direct input if the user sets "Saturday at noon" as part of the parameters of the field test. In another example, where the user does not input an exact date and time, the testing platform 101 may determine the testing schedule based on the other parameters which were defined. For example, the user may set off-peak hours as a testing parameter. If the user defines such indirect scheduling information, the testing platform 101 may schedule a test during determined off-peak hours. In another example where the test engineer sets parameters that are not time-sensitive, the testing platform 101 may schedule a field test at any time.

In step 605, the testing platform 101 initiate a synchronization of the test route, the one or more field tests, or a combination thereof between the device under testing, the reference device, or a combination thereof via a local wireless connection, a server-based connection, or a combination thereof. The testing platform 101 may utilize the various networks 109-115 to sync the various devices 103 and 105 within the same test route and testing environment. Additionally, the application 107 may manage a connection between the devices 103 and 105 using local Bluetooth or WiFi for capability exchange and synchronizing field test execution. In this way, test routes, test environments, and test schedules are all synchronized between the testing platform 101, application 107, and devices 103 and 105. In an example where multiple DUTs 105 may undergo a test environment simultaneously, a single reference device 103 may be synchronized with all of the DUTs 105. Additionally, the multiple DUTs 105 are synchronized with one another in addition to the testing platform 101.

Figure 7:
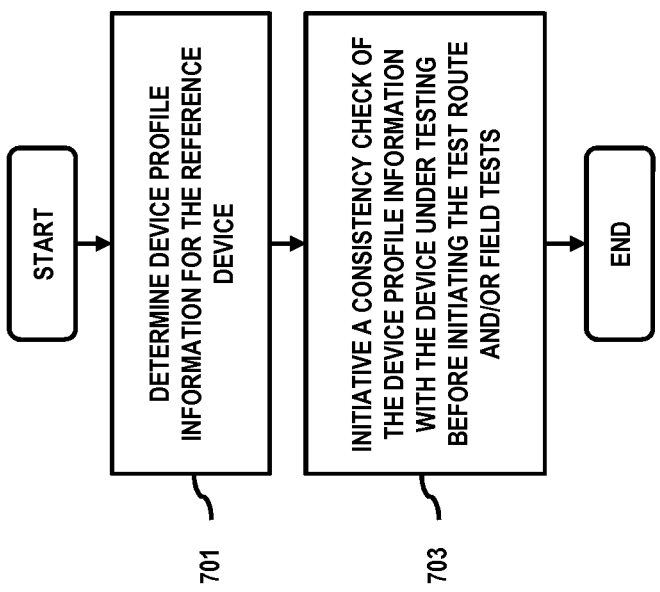
FIG. 7 is a flowchart for determining and initiating a consistency check among the devices involved in the field test, according to one embodiment.

FIG. 7 is a flowchart for determining and initiating a consistency check among the devices involved in the field test, according to one embodiment. Although FIG. 7 illustrates steps 701 through 703 in a particular order, the order and number of steps is merely for explanation, and one or more steps may be performed in a different order or removed. In one embodiment, the testing platform 101 performs the process 700 and is implemented in, for instance, a chip set including a processor and a memory as shown in FIG. 13. In step 701, the testing platform may determine device profile information for the reference device. The device settings and capabilities on both devices 103 and 105 must be the same in order for test engineers and the system 100 to compare the performances of the devices 103 and 105. In one embodiment, the application 107 may create a profile file for each device comprising of: network mode (4G, 3G, etc.), IMS registration status (IMS registered, not registered, etc.), RSRP, battery level, and idle CPU utilization. In one embodiment, the reference device 103 may send this profile file to the DUT 105 via a location connection like WiFi or Bluetooth. The application 107 may run a synchronization test between the profile files. This process may be repeated for each DUT 105 that may be tested.

In step 703, the testing platform 101 initiates a consistency check of the device profile information with the device under testing before initiating the test route, the one or more field tests, or a combination thereof. Once the application 107 has compared the profiles and checked for consistency, the application 107 may summarize any differences and present a notification of the information so that the test engineer may make the necessary adjustments to the devices 103 and/or 105 to make them consistent. This profile consistency checking may repeat until the devices are synchronized. For example, if the application 107 within a DUT 105 determines that the battery level on DUT 105 is at 50% and the battery level on the reference device is at 75%, the application 107 may create a notification alerting the test engineer of the disparity. The test engineer would have to charge up one of the batteries and/or discharge the other battery so that both the devices 103 and 105 may be exactly the same number. The test engineer may then initiate the application 107 to re-run the synchronization test. Once again, this process may be repeated multiple times until both of the devices are synchronized among the listed features.

Figure 8:
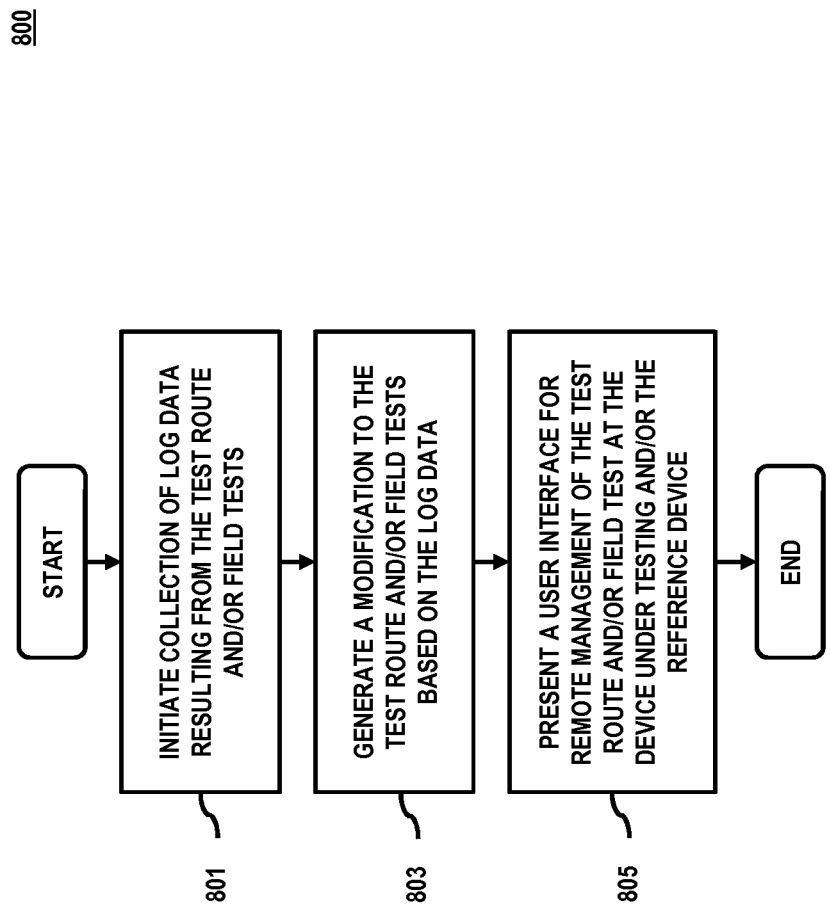
FIG. 8 is a flowchart for managing field tests during and after the field test, according to one embodiment.

FIG. 8 is a flowchart for managing field tests during and after the field test, according to one embodiment. Although FIG. 8 illustrates steps 801 through 803 in a particular order, the order and number of steps are merely for explanation, and one or more steps may be performed in a different order or removed. In one embodiment, the testing platform 101 performs the process 800 and is implemented in, for instance, a chip set including a processor and a memory as shown in FIG. 13. In step 801, the testing platform 101 may initiate collection of log data resulting from the test route, the one or more field tests, or a combination thereof. Once the test route or field test is underway, DUT 105 performance is immediately captured in log form. The logs capture the testing device's 103 and 105 specifications and statistical performance throughout the field test. In one embodiment, the application 107 may collect the log data. In one embodiment, the log may also track and log the device's 103 and 105 sensor data and readings that were picked up before, during, and after the field test. The application 107 may upload this log data to the testing platform 101 upon completion of the test route or field test.

In step 803, the testing platform 101 may generate a modification to the test route, the one or more field tests, or a combination thereof based on the log data. The testing platform 101 may receive input to create a testing environment which are contingent on the performance of a previous or current test. For example, the testing platform 101 may receive input to repeat an entire test should the DUT's 105 performance surpass a certain level. In another example, the testing platform may also prematurely end a test should the DUT 105 fall below a certain level. In another example, the testing platform 101 may receive input indicating that the test should continue until the battery level on the testing device falls to five percent.

In step 805, the testing platform 101 may present a user interface for remote management of the test route, the one or more field tests, or a combination thereof at the device under testing, the reference device, or a combination thereof. The test routes and field tests may be managed remotely in real time. Therefore, while the testing platform 101 or the application 107 may initiate field tests automatically, there is also an option for a remote test engineer to initiate the field tests from afar. Additionally the remote test engineer may end, monitor, or create new field tests based on contingent criteria (see above). For example, if a field test includes two DUT 105 undergoing the same test at the same time and the test engineer notices trends in the performance of the DUT 105 where there are multiple variables and the test engineer is curious about how the DUT 105 might perform if a certain variable is isolated, the test engineer may initiate and define such a test for one of the two DUT 105 in the field test, while leaving the other DUT 105 in the original field test.

Figure 9:
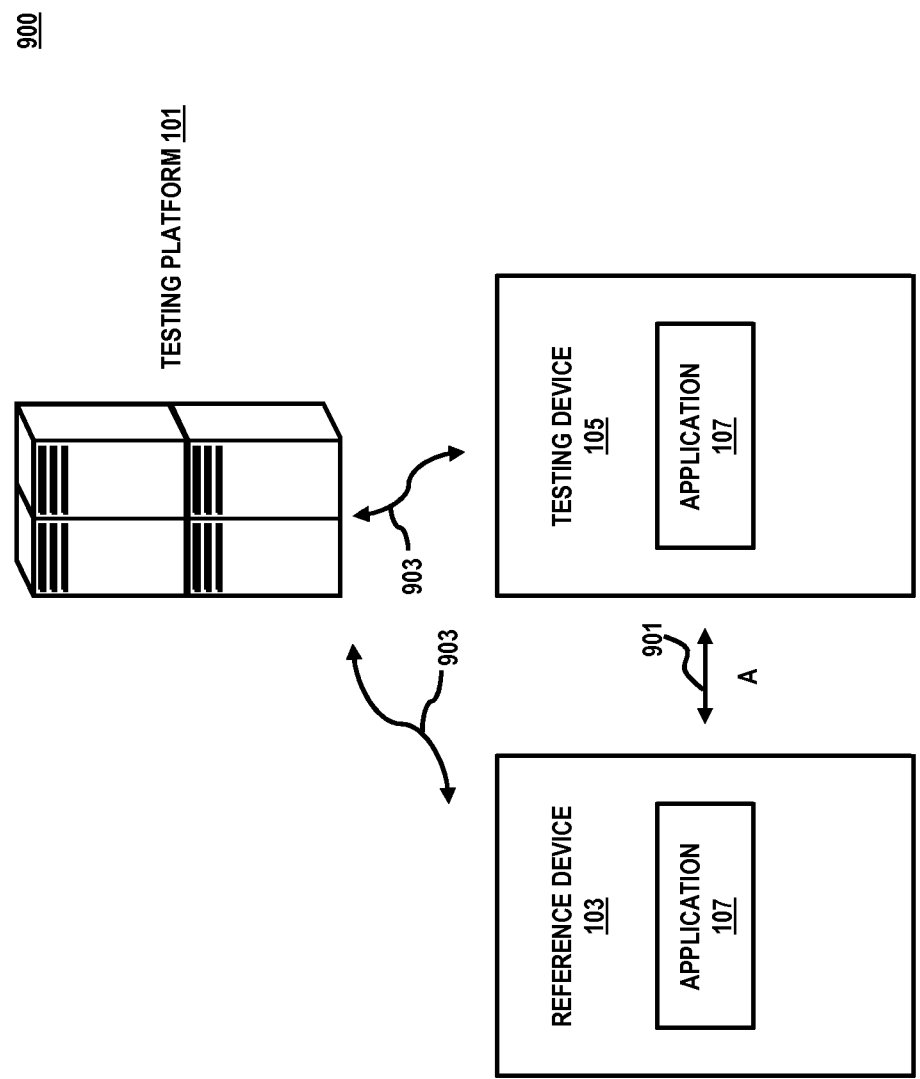
FIG. 9 is a diagram for platform-based device field test architecture, according to one embodiment.

FIG. 9 is a diagram for platform-based device field test architecture, according to one embodiment. The system 900 contains a testing platform 101, reference device 103, DUT 105, and application 107. The reference devices 103 have undergone thorough tests and has a documented history of consistently above average performance. The device performance measured may test the device's software, hardware, and mechanical characteristics. That is, the reference device 103 generally represents a benchmark for quality and acceptability in the industry. In comparison, the DUT 105 must meet or exceed the reference device 103's performance. The functionality and performance of the DUT 105 are characterized and compared against the reference devices 103. The testing platform 101 may store the device logs and hosts the requisite tools to synchronize testing and analyze the device logs.

The testing platform 101 may control the devices 103 and 105 using the application 107. In the system 900, the application 107 may execute test scenarios on the devices 103 and 105 and collect device logs. Wireless connection 901 represents the method by which the devices 103 and 105 may be connected. In one embodiment, A might represent a Bluetooth or WiFi connection. The application 107 uses this connection to coordinate synchronization between the devices and manage the driving test schedule. Wireless connection 903 represents a wireless connection between the testing platform 101 and the devices 103 and 105 and could be supported by a service provider network 109, data network 115, or any of the other networks 109-115. Test routes and test scenarios are pushed remotely from the testing platform 101 to the devices 103 and 105 via wireless connection 903. In one embodiment, after completing the field test, the devices 103 and 105 automatically uploads the logs to the testing platform 101 for post processing and analysis.

In another embodiment, the testing platform 101 may push a test analyzer (not shown) to the reference device 103 via wireless connection 903. Once the testing is completed, the DUT 105 may perform the post-processing analysis before pushing the device logs to the reference device 103. A summary of the results may be displayed on the reference device 103.

Figure 10:
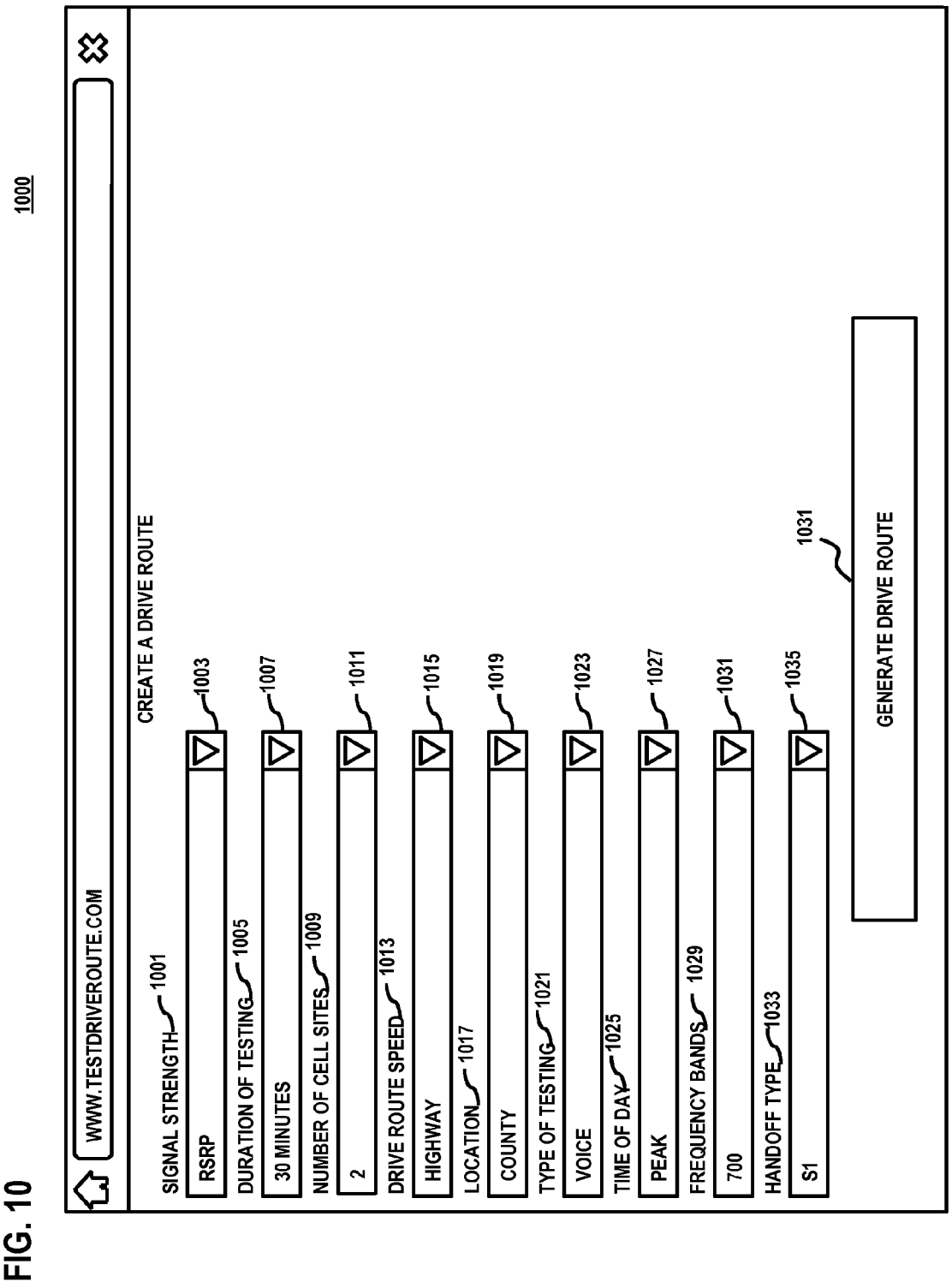
FIG. 10 is a diagram of a user interface by which a user may input the parameters of a test route or test environment, according to one embodiment.

FIG. 10 is a diagram of a user interface by which a user may input the parameters of a test route or test environment, according to one embodiment. In an exemplary embodiment, the parameters may be presented in the form of a web application and each parameter may include a drop down menu of possible choices. For example, the signal strength 1001 may have a drop down 1003 of options like RSRP, RSRQ, SINR, etc. The duration of testing 1005 may have a drop down 1007 of different time segments like every 15 minutes, every 30 minutes, every hour, etc. The number of cell sites 1009 may have drop down 1011 with consecutive whole numbers starting at one. The test route speed 1013 may have drop down 1015 with various types of roadways, with each roadway representing a range of speed limits. In another embodiment, the drop down may contain actual ranges in speed limits like, 20-30 MPH or 50-60 MPH. The location 1017 section may have drop down 1019 with the names of different localities like states, cities, counties, neighborhoods, etc. The type of testing 1021 may have drop down 1023 which may list the option between voice, data, or a combination of both. The time of day 1025 may have drop down 1027 listing peak or off peak traffic. The frequency bands 1029 may have drop down 1031 listing different frequency bands such as 700, AWS, etc. The handoff type 1033 may have dropdown 1035 listing handoffs like S1 vs. X2. In one embodiment, it is not necessary for the user to provide input for all of these categories. Instead, the user may simply input the parameters that are necessary to create the desired test environment. Once the user has inputted enough criteria to create her desired testing environment, she may initialize route generation by hitting the generate test route button 1031.

Figure 11:
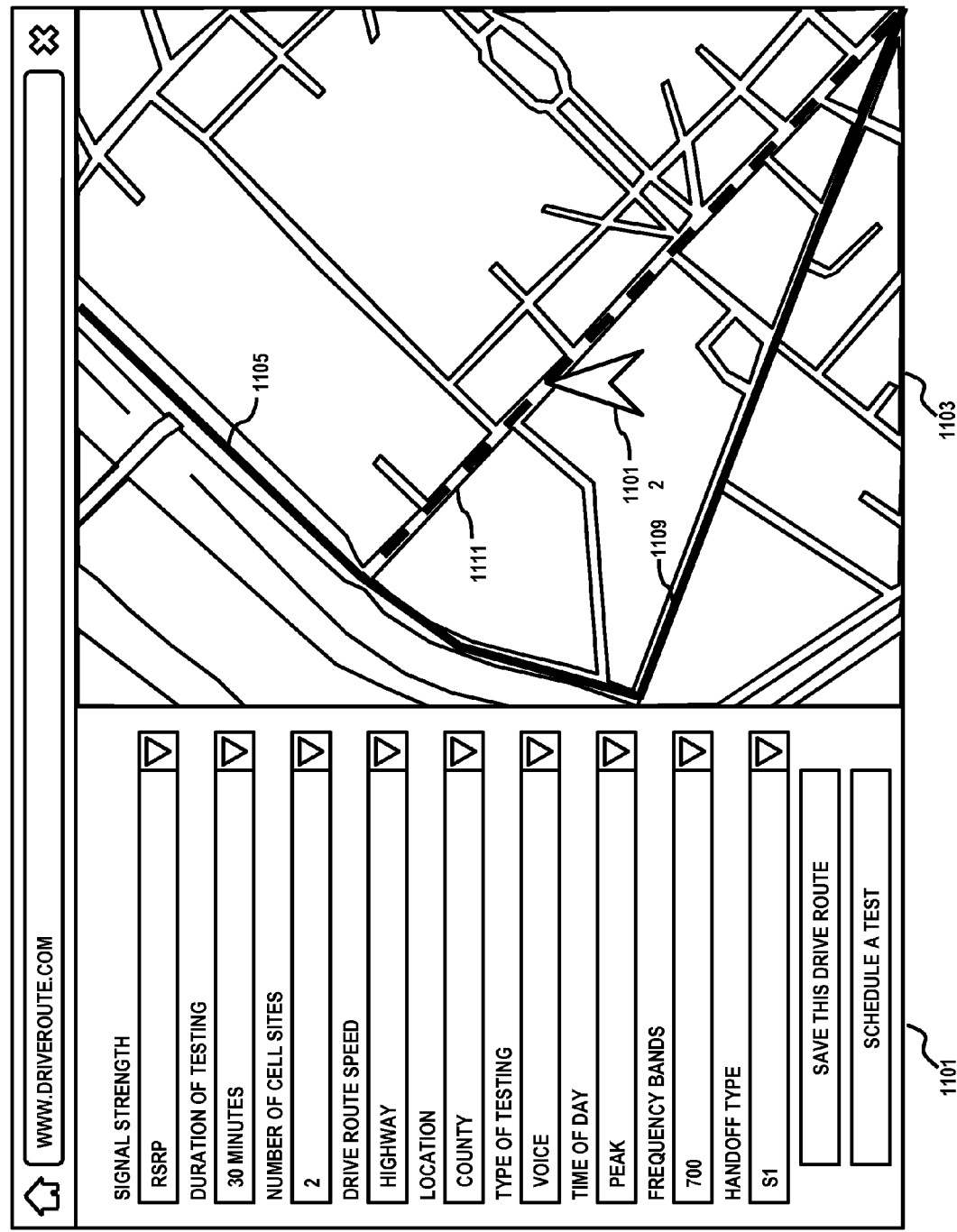
FIG. 11 is a diagram of the two-way dependency between the list of parameters and an interactive map application or web service, according to one embodiment.

FIG. 11 is a diagram of the two-way dependency between the list of parameters and an interactive map application or web service, according to one embodiment. Column 1101 represents the same list of parameters from FIG. 10. Column 1103 represents an interactive map window. Route 1105 represents a generated route based on initial parameters inputted by the user. Cursor 1107 has clicked and dragged the 1109 section of the route 1105 to create a potentially new route 1111. Route 1111 is currently in a dashed line to highlight the pending status of the new route. Changes to the parameters in column 1103 would then be immediately reflected locally on the web application interface. However, it will not be until the user clicks on "Save This Test Route" 1113 will the input edits be communicated to the testing platform 101 or devices 103 and 105. The user may click on "Schedule A Test" button 1115 in order to go to a screen where the user may input a time and date or a range of times and dates for which the testing platform 101 may schedule a test. Alternatively, the user may change any of the variables in column 1103 in order for the map in column 1103 to display a new dotted line which may reflect how the change in the parameter may affect the resultant test route.

Figure 12A:
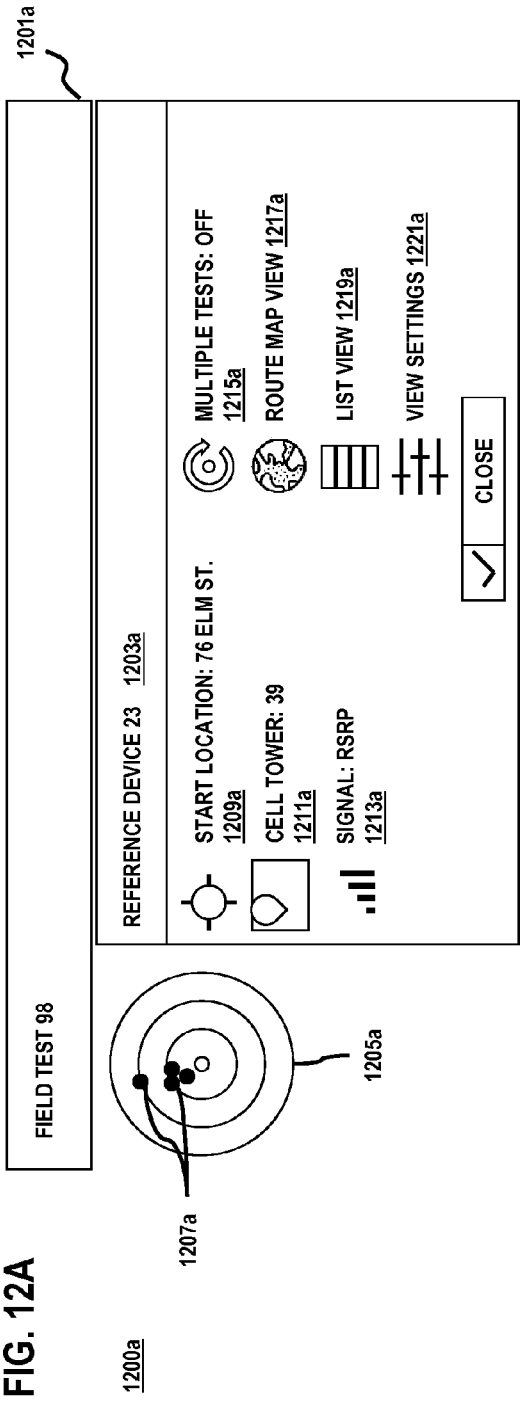
FIGS. 12A-12B are diagrams of user interfaces for the reference and device under test during a field test, according to one embodiment.
Figure 12B:
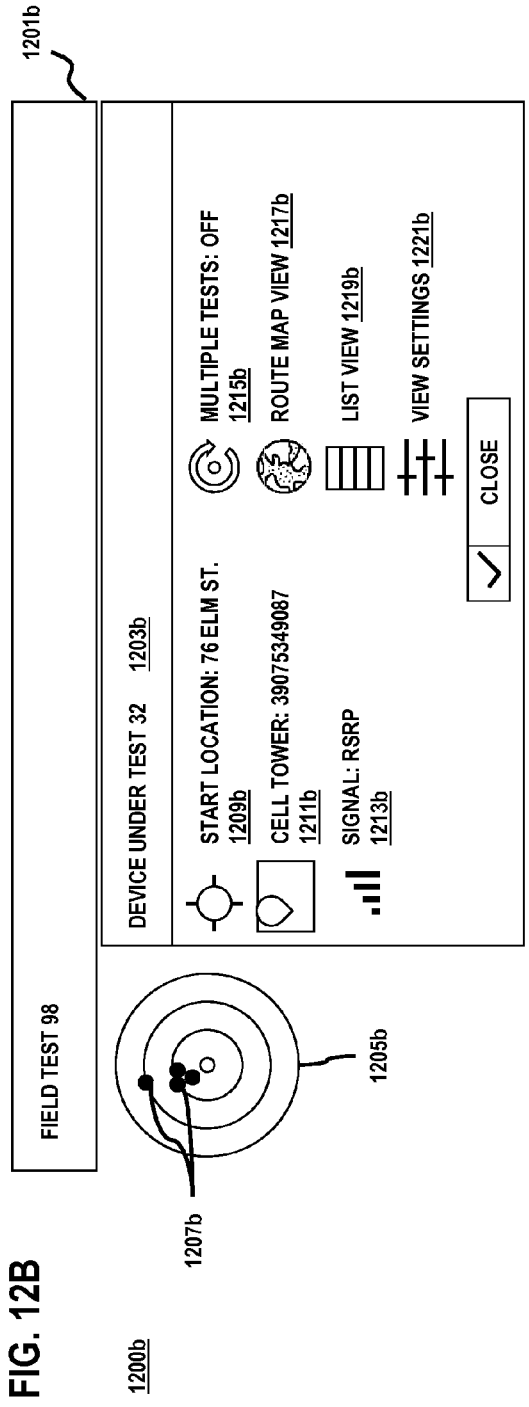

FIGS. 12A-12B are diagrams of user interfaces for the reference and device under test during a field test, according to one embodiment. FIG. 12A displays the user interface screen 1200a, a user interface for a reference device 103. The header 1201a of the interface 1200a identifies the field test number (98), which identifies the field test in a system. The interface's 1200a subheader 1203a identifies the reference device 105 number (23). The satellite map 1205a displays an image of the cell towers 1207a that may be involved in this "Field Test 98." The Start Location: 76 Elm St. 1209a identifies the beginning address of the "Field Test 98." The Cell Tower 39 1211a identifies the cell tower presently active in the "Field Test 98." The Signal: RSRP 1213a identifies the current signal receive power, which is one of the parameters "Field Test 98" is monitoring. Additional information on the interface 1200a may include an option to initiate multiple (e.g., if-then clause based additional tests, tests that take place on a loop test route, repeats of the current test, etc.) tests in the Multiple Tests: Off 1215a button. The user may also switch to an in-map view during the test by selecting the Route Map View 1217a (see FIG. 13A-13B). The List View 1219a shows the lists of parameters inputted for this field test. The View Settings 1221a allows the test engineer to change the current settings of the application 107.

FIG. 12B is a display of the user interface from "Field Test 98," but from the DUT 105, according to one embodiment. In one embodiment, the screens of the two devices 103 and 105 of "Field Test 98" are coordinated by design to display the same interface and statistics about the current field test. The "Field Test 98" DUT 105 displays the screen 1200b. The header 1201b is identical to the header in 1201a, with both headers identifying the field test by number ("98"). The subheader 1203b is the only difference between the interfaces 1200a and 1200b in that the subheader 1203b displays the Device Under Test 32 1203b, identify the device is the DUT 105 and also provides the device number ("32"). The rest of the interface 1200b includes the same data from 1200a, such as the satellite map of the cell towers 1205b, the location of the cell towers in this test 1207b, the start location 1209b, the current cell tower in the field test 1211b, the signal type being tested 1213b, the multiple tests toggle 1215b, the route map view 1217b, the list view 1219b, and the view settings 1221b may display the same coordinated information that is displayed on the interface 1200a.

Figure 13A:
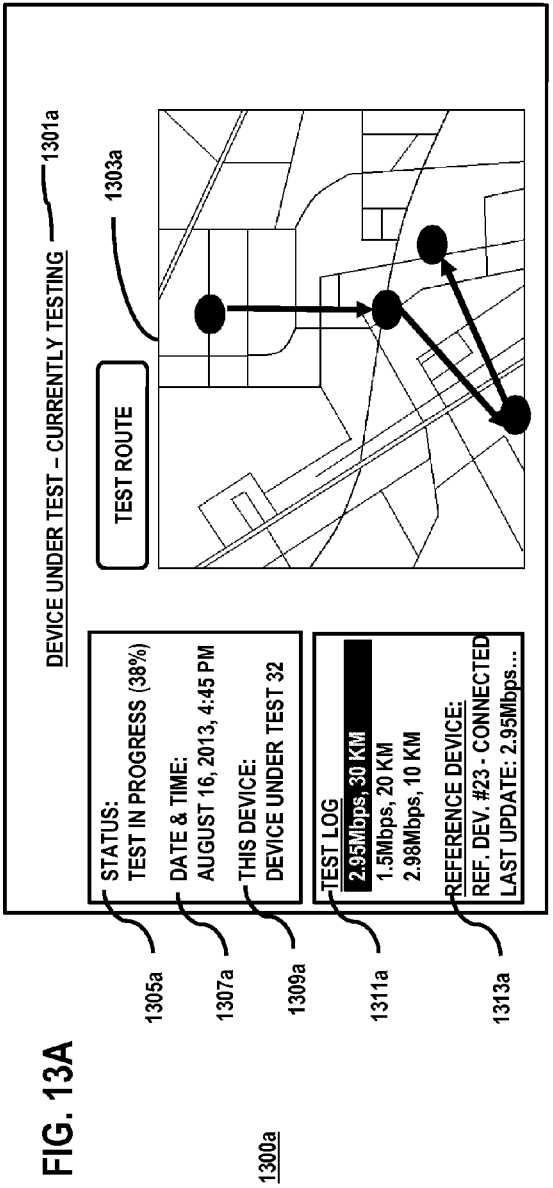
FIGS. 13A-13B are diagrams of the map user interfaces for the reference and device under test during a field test, according to one embodiment.
Figure 13B:
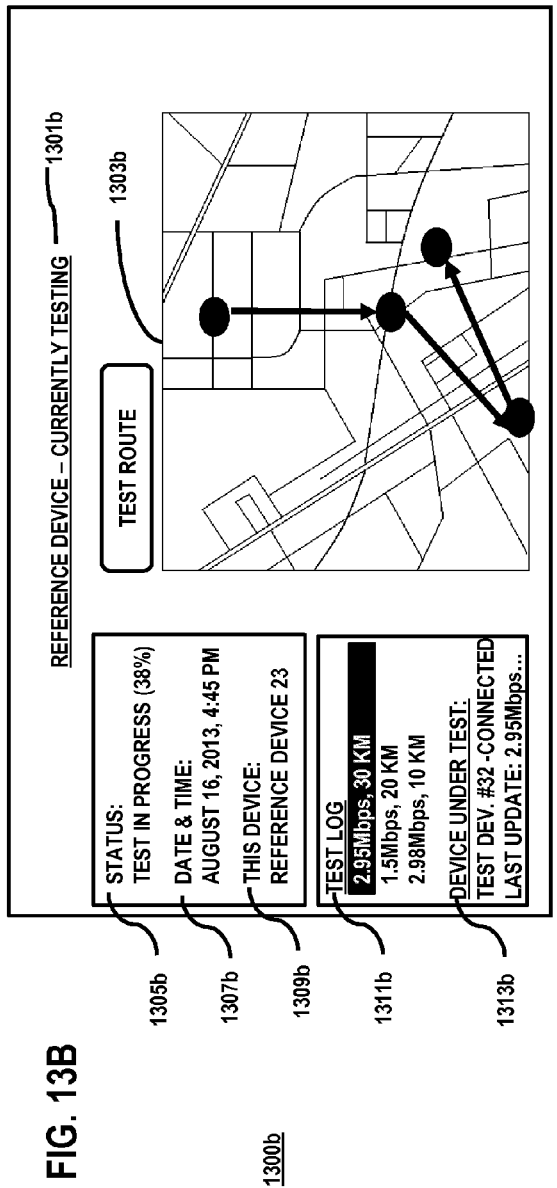

FIGS. 13A-13B are diagrams of the map user interfaces for the reference and device under test during a field test, according to one embodiment. FIG. 13A displays an alternative view from the user interface screen 1200a and 1200b of the reference device 103 and the DUT 105, respectively. The test engineer may navigate to the map view by selecting the Route Map View button 1217b in the use interface screen 1200b (see FIGS. 12A-12B). The map view interface screen 1300a has the title 1301a which identifies the Device Under Test—Currently Testing. The title 1301a identifies the current device as the device 103 or 105 and the status of the field test. The interface 1300a displays a map with the test route in 1303a. A presentation of field test data like the status 1305a, which displays in greater detail the current status of the field test in progress, like providing the percentage of the test which has been completed so far. The Data and Time 1307a displays the current date and time. The This Device 1309a identifies that this is the device under test number 32. The test log 1311a displays the latest additions to the test log as it is updated with test results. In this example, different data signal speeds are measured every ten kilometers. In other embodiments, the user may opt to display various parameters which are being tested or view a mix of all of the parameters as they become updated in the test log. Finally, the Reference Device section 1313a displays the coordinated reference device 103, lists the reference device number ("23") and the status (connected, connecting, searching, not assigned, etc.), and the last update sent to the test log on the reference device. In this example, the latest Mbsp measured at the 30 KM mark has been sent to the "Reference Device 23."

FIG. 13B displays the map view 1300b for the "Reference Device 23." The header 1301b identifies the device as the reference device 103 and provides a quick status ("Currently Testing"). The test route window 1303b is identical to the DUT's 105 1303a test route map window. The Status 1305b, Date and Time 1307b reflects the coordination between the devices 103 and 105 during a field test by containing matching data (test progress percentage and date and time). The This Device 1309b identifies the current reference device and its identifying device number ("23"). The Test Log 1311b displays the latest log updates received from the DUT 103. The Device Under Test 1313b displays information about the coordinated device like identifying information about the DUT 105 for the current field test ("Test Dev. #32"), and the status of the current DUT 105 (connected, connecting, searching, not assigned, etc.) The Device Under Test 1313b also displays the latest addition to the test log. In another embodiment, the latest log update may be changed to the latest time the log updated, or a combination of the latest data received and the time at which that data was received.

Figure 14:
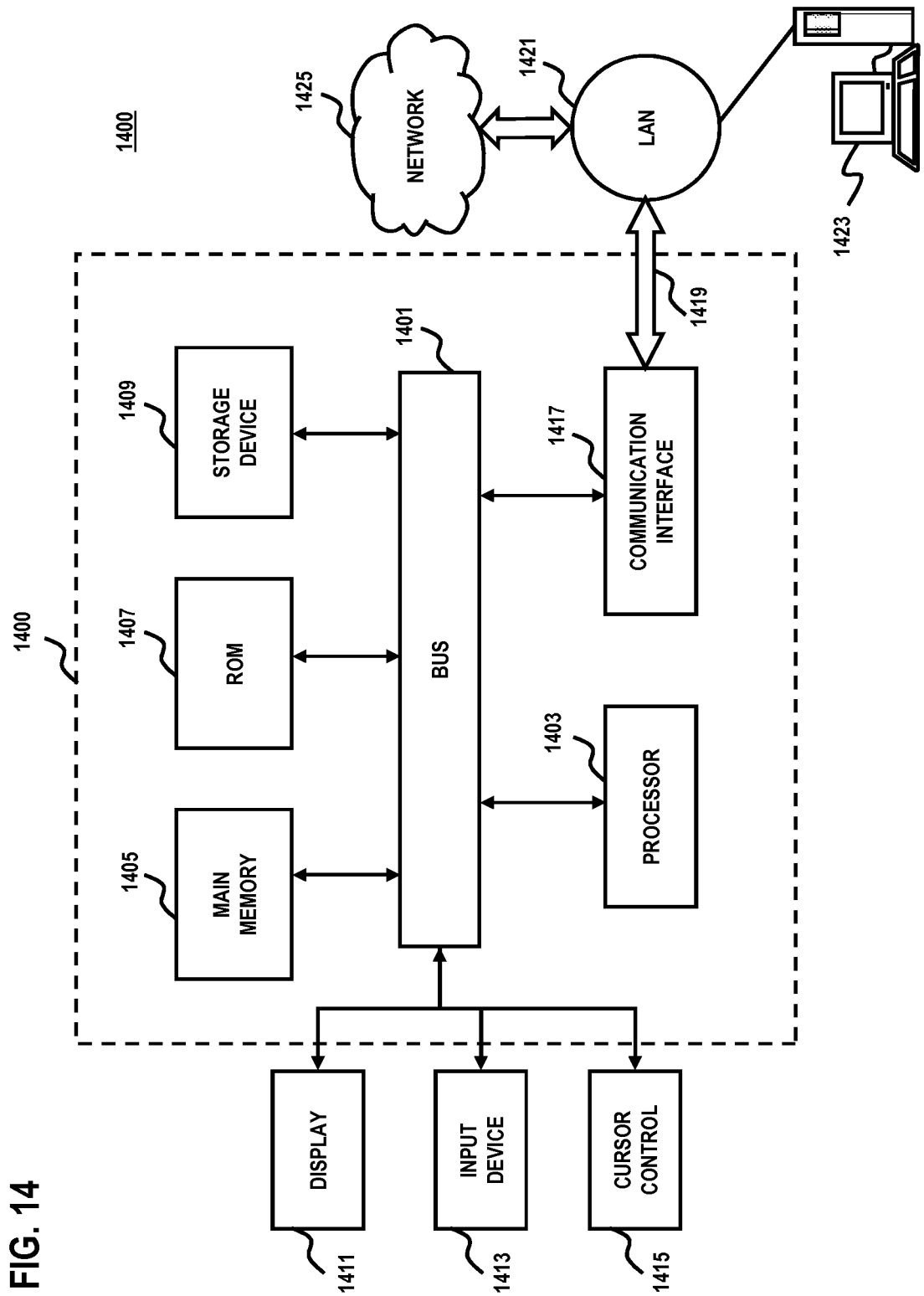
FIG. 14 is a diagram of a computer system that can be used to implement various embodiments.

FIG. 14 is a diagram of a computer system that can be used to implement various embodiments. The computer system 1400 may be coupled via the bus 1401 to a display 1411, such as a cathode ray tube (CRT), liquid crystal display, active matrix display, or plasma display, for displaying information to a computer user. An input device 1413, such as a keyboard including alphanumeric and other keys, is coupled to the bus 1401 for communicating information and command selections to the processor 1403. Another type of user input device is a cursor control 1415, such as a mouse, a trackball, or cursor direction keys, for communicating direction information and command selections to the processor 1403 and for controlling cursor movement on the display 1411.

According to an embodiment of the invention, the processes described herein are performed by the computer system 1400, in response to the processor 1403 executing an arrangement of instructions contained in main memory 1405. Such instructions can be read into main memory 1405 from another computer-readable medium, such as the storage device 1409. Execution of the arrangement of instructions contained in main memory 1405 causes the processor 1403 to perform the process steps described herein. One or more processors in a multi-processing arrangement may also be employed to execute the instructions contained in main memory 1405. In alternative embodiments, hard-wired circuitry may be used in place of or in combination with software instructions to implement the embodiment of the invention. Thus, embodiments of the invention are not limited to any specific combination of hardware circuitry and software.

The computer system 1400 also includes a communication interface 1417 coupled to bus 1401. The communication interface 1417 provides a two-way data communication coupling to a network link 1419 connected to a local network 1421. For example, the communication interface 1417 may be a digital subscriber line (DSL) card or modem, an integrated services digital network (ISDN) card, a cable modem, a telephone modem, or any other communication interface to provide a data communication connection to a corresponding type of communication line. As another example, communication interface 1417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1417 sends and receives electrical, electromagnetic, or optical signals that carry digital data streams representing various types of information. Further, the communication interface 1417 can include peripheral interface devices, such as a Universal Serial Bus (USB) interface, a PCMCIA (Personal Computer Memory Card International Association) interface, etc. Although a single communication interface 1417 is depicted in FIG. 14, multiple communication interfaces can also be employed.

The network link 1419 typically provides data communication through one or more networks to other data devices. For example, the network link 1419 may provide a connection through local network 1421 to a host computer 1423, which has connectivity to a network 1425 (e.g. a wide area network (WAN) or the global packet data communication network now commonly referred to as the "Internet") or to data equipment operated by a service provider. The local network 1421 and the network 1425 both use electrical, electromagnetic, or optical signals to convey information and instructions. The signals through the various networks and the signals on the network link 1419 and through the communication interface 1417, which communicate digital data with the computer system 1400, are exemplary forms of carrier waves bearing the information and instructions.

The computer system 1400 can send messages and receive data, including program code, through the network(s), the network link 1419, and the communication interface 1417. In the Internet example, a server (not shown) might transmit requested code belonging to an application program for implementing an embodiment of the invention through the network 1425, the local network 1421 and the communication interface 1417. The processor 1403 may execute the transmitted code while being received and/or store the code in the storage device 1409, or other nonvolatile storage for later execution. In this manner, the computer system 1400 may obtain application code in the form of a carrier wave.

The term "computer-readable medium" as used herein refers to any medium that participates in providing instructions to the processor 1403 for execution. Such a medium may take many forms, including but not limited to nonvolatile media, volatile media, and transmission media. Non-volatile media include, for example, optical or magnetic disks, such as the storage device 1409. Volatile media include dynamic memory, such as main memory 1405. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 15:
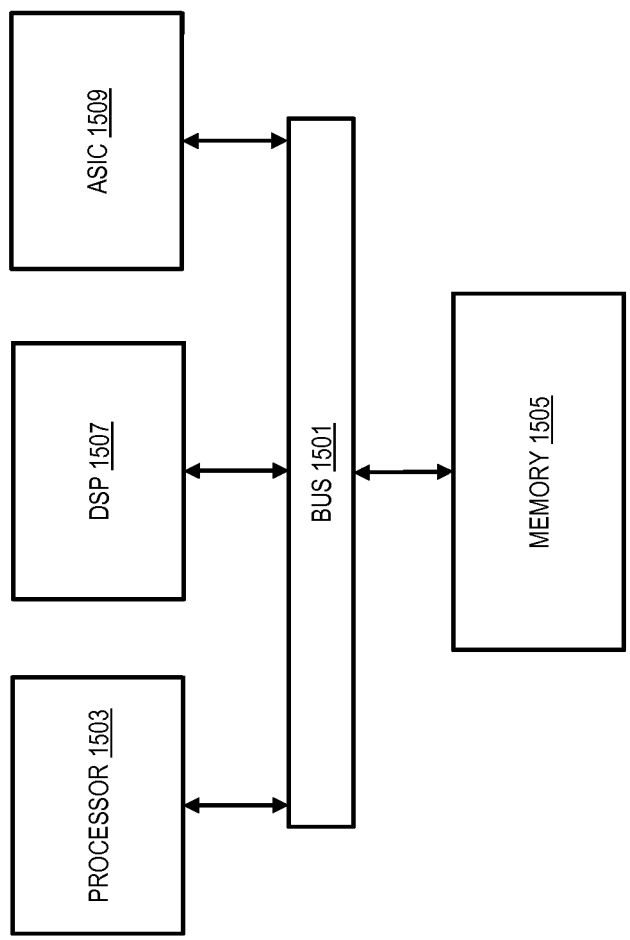
FIG. 15 illustrates a chip set 1500 upon which an embodiment of the invention may be implement.

FIG. 15 illustrates a chip set 1500 upon which an embodiment of the invention may be implemented. Chip set 1500 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of FIGS. 2-4, 7, and 9A-9D.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1505 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving inputs specifying two or more parameters for evaluating a device under testing,
   wherein the two or more parameters include at least two of a signal strength parameter, a duration testing parameter, a number of cell sites parameter, a drive route speed parameter, a location parameter, a testing type parameter, a time parameter, a frequency band parameter, or a handoff type parameter; and
   generating a test route based on the inputs,
   wherein the test route represents a test environment in which the device under testing is expected to be subjected to the two or more parameters.

2. The method of claim 1, further comprising:
   receiving another input for specifying a manual modification to the test route;
   generating a modified test route based on the another input; and
   calculating one or more modified parameters associated with the modified test route.

3. The method of claim 1, further comprising:
   transmitting the test route to the device under testing, a reference device, or a combination thereof; and
   initiating a navigation application at the device under testing, the reference device, or a combination thereof to present the test route.

4. The method of claim 3, further comprising:
   generating a schedule of one or more field tests to perform during the test route; and
   transmitting the schedule to the device under testing, the reference device, or a combination thereof.

5. The method of claim 4, further comprising:
   initiating a synchronization of the test route, the one or more field tests, or a combination thereof between the device under testing, the reference device, or a combination thereof via a local wireless connection, a server-based connection, or a combination thereof.

6. The method of claim 4, further comprising:
   determining device profile information for the reference device; and
   initiating a consistency check of the device profile information with the device under testing before initiating the test route, the one or more field tests, or a combination thereof.

7. The method of claim 4, further comprising:
   initiating collection of log data resulting from the test route, the one or more field tests, or a combination thereof; and
   generating a modification to the test route, the one or more field tests, or a combination thereof based on the log data.

8. The method of claim 4, further comprising:
   presenting a user interface for remote management of the test route, the one or more field tests, or a combination thereof at the device under testing, the reference device, or a combination thereof.

9. An apparatus comprising a processor configured to:
   receive inputs specifying two or more parameters for evaluating a device under testing;
   wherein the two or more parameters include at least two of a signal strength parameter, a duration testing parameter, a number of cell sites parameter, a drive route speed parameter, a location parameter, a testing type parameter, a time parameter, a frequency band parameter, or a handoff type parameter; and
   generate a test route based on the inputs,
   wherein the test route represents a test environment in which the device under testing is expected to be subjected to the two or more parameters.

10. The apparatus of claim 9, wherein the processor is further configured to:
    receive another input for specifying a manual modification to the test route;
    generate a modified test route based on the another input; and
    calculate one or more modified parameters associated with the modified test route.

11. The apparatus of claim 9, wherein the processor is further configured to:
    transmit the test route to the device under testing, a reference device, or a combination thereof; and
    initiate a navigation application at the device under testing, the reference device, or a combination thereof to present the test route.

12. The apparatus of claim 11, wherein the processor is further configured to:
    generate a schedule of one or more field tests to perform during the test route; and
    transmit the schedule to the device under testing, the reference device, or a combination thereof.

13. The apparatus of claim 12, wherein the processor is further configured to:
    initiate a synchronization of the test route, the one or more field tests, or a combination thereof between the device under testing, the reference device, or a combination thereof via a local wireless connection, a server-based connection, or a combination thereof.

14. The apparatus of claim 12, wherein the processor is further configured to:
    determine device profile information for the reference device; and
    initiate a consistency check of the device profile information with the device under testing before initiating the test route, the one or more field tests, or a combination thereof.

15. The apparatus of claim 12, wherein the processor is further configured to:
  initiate collection of log data resulting from the test route, the one or more field tests, or a combination thereof; and
  generate a modification to the test route, the one or more field tests, or a combination thereof based on the log data.

16. The apparatus of claim 12, wherein the processor is further configured to:
  present a user interface for remote management of the test route, the one or more field tests, or a combination thereof at the device under testing, the reference device, or a combination thereof.

17. A system comprising:
  a testing platform configured to:
  receive inputs specifying two or more parameters for evaluating a device under testing, wherein the two or more parameters include at least two of a signal strength parameter, a duration testing parameter, a number of cell sites parameter, a drive route speed parameter, a location parameter, a testing type parameter, a time parameter, a frequency band parameter, or a handoff type parameter; and
  generate a test route based on the inputs, wherein the test route represents a test environment in which the device under testing is expected to be subjected to the two or more parameters.

18. The system of claim 17, wherein the testing platform is further configured to:
  receive another input for specifying a manual modification to the test route,
  generate a modified test route based on the other input, and
  calculate one or more modified parameters associated with the modified test route.

19. The system of claim 17, wherein the testing platform is further configured to:
  transmit the test route to at least one of the device under testing or a reference device, and
  initiate a navigation application at the at least one of the device under testing or the reference device to present the test route.

20. The system of claim 19, wherein the testing platform is further configured to:
  generate a schedule of one or more field tests to perform during the test route; and
  transmit the schedule to the at least one of the device under testing or the reference device.

* * * * *